United States Patent
Yeh et al.

(10) Patent No.: US 10,563,906 B2
(45) Date of Patent: Feb. 18, 2020

(54) CAMERA ANTIFOGGING ASSEMBLY AND REFRIGERATOR EMPLOYING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jung-Chun Yeh, New Taipei (TW); Jun-Jin Lai, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 120 days.

(21) Appl. No.: 15/869,095

(22) Filed: Jan. 12, 2018

(65) Prior Publication Data

US 2019/0113272 A1    Apr. 18, 2019

(30) Foreign Application Priority Data

Oct. 18, 2017    (CN) .......................... 2017 1 0972417

(51) Int. Cl.
| | |
|---|---|
| *F25D 23/12* | (2006.01) |
| *F25D 21/04* | (2006.01) |
| *F25D 23/02* | (2006.01) |
| *G03B 17/55* | (2006.01) |
| *G03B 17/56* | (2006.01) |
| *G03B 29/00* | (2006.01) |

(52) U.S. Cl.
CPC .............. *F25D 23/12* (2013.01); *F25D 21/04* (2013.01); *F25D 23/028* (2013.01); *G03B 17/55* (2013.01); *G03B 17/561* (2013.01); *G03B 29/00* (2013.01); *F25D 2400/36* (2013.01)

(58) Field of Classification Search
CPC ........ F25D 23/028; F25D 11/00; F25D 21/04; G03B 17/561
See application file for complete search history.

(56) References Cited

U.S. PATENT DOCUMENTS

| 9,995,528 B1* | 6/2018 | Ebrom ..................... F25D 29/00 |
| 2016/0033194 A1* | 2/2016 | Sumihiro ................ F25D 23/04 62/125 |
| 2016/0057394 A1* | 2/2016 | Marutani ................ F25D 23/04 348/143 |
| 2016/0138860 A1* | 5/2016 | Kang ...................... F25D 29/00 62/130 |
| 2016/0182868 A1* | 6/2016 | Izawa .................... G03B 17/02 62/125 |
| 2016/0223250 A1* | 8/2016 | Kang ...................... F25D 29/00 |
| 2017/0041520 A1* | 2/2017 | Carlotto .............. H04N 5/2252 |

(Continued)

FOREIGN PATENT DOCUMENTS

CN            206377923 U        8/2017

*Primary Examiner* — Kun Kai Ma
(74) *Attorney, Agent, or Firm* — ScienBiziP, P.C.

(57) ABSTRACT

A camera antifogging assembly to prevent fogging of an internal camera due to temperature contrasts is coupled to a door of a refrigerator and includes a base, a camera, and an antifogging plate. The base is coupled to the door. The camera is coupled to the base. The antifogging plate includes a cover and a heat generator. The cover covers to the base. The heat generator is coupled to the cover and surrounds the camera. A refrigerator employing the camera antifogging assembly is also provided.

14 Claims, 6 Drawing Sheets

(56) References Cited

U.S. PATENT DOCUMENTS

2017/0234602 A1* 8/2017 Seo .................. F21V 33/00
 348/151
2017/0311385 A1* 10/2017 Gasworth ............ H05B 3/0033
2018/0172343 A1* 6/2018 Grimminger ........... F25D 29/00
2018/0224151 A1* 8/2018 Froehlich ............... F24F 11/523
2018/0335252 A1* 11/2018 Oh ...................... F25D 29/005

* cited by examiner

CAMERA ANTIFOGGING ASSEMBLY AND REFRIGERATOR EMPLOYING SAME

FIELD

The subject matter herein generally relates to a camera antifogging assembly and a refrigerator employing the camera antifogging assembly.

BACKGROUND

Many refrigerators include at least one camera inside. However, when a door of the refrigerator is opened, fog may form and block the camera, which may affect capturing ability of the camera.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
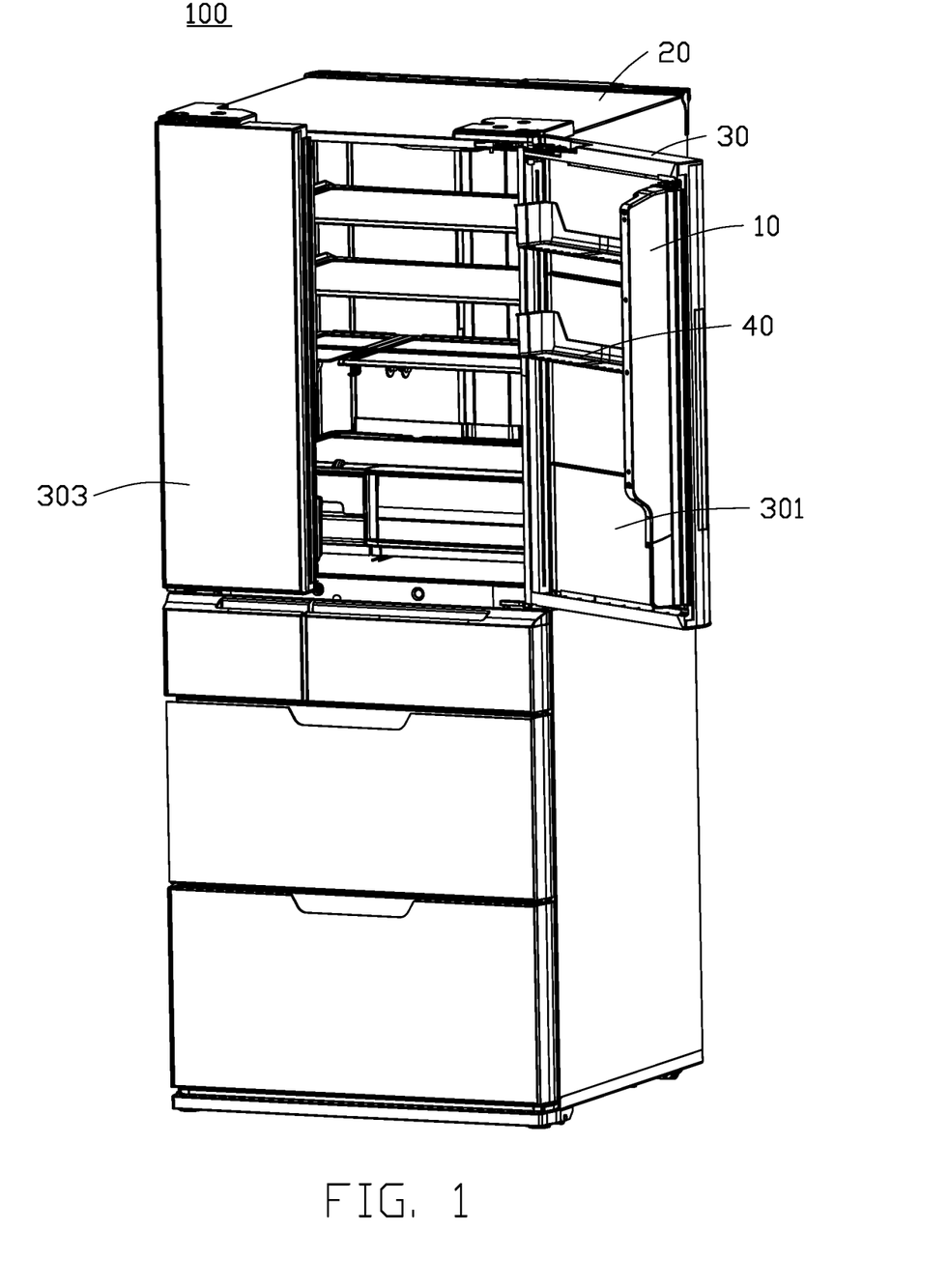
FIG. 1 is an isometric view of an exemplary embodiment of a refrigerator employing a camera antifogging assembly.

FIG. 1 illustrates a refrigerator 100. The refrigerator 100 includes a camera antifogging assembly 10, a body 20, and a door 30. The door 30 is coupled to the body 20 and can be opened and closed to the body 20. The camera antifogging assembly 10 is coupled to the door 30. When the door 30 is closed, the camera antifogging assembly 10 faces the body 20. In at least one embodiment, the door 30 includes an inner surface 301 facing the body 20 and an outer surface 303 facing away from the body 20.

Figure 2:
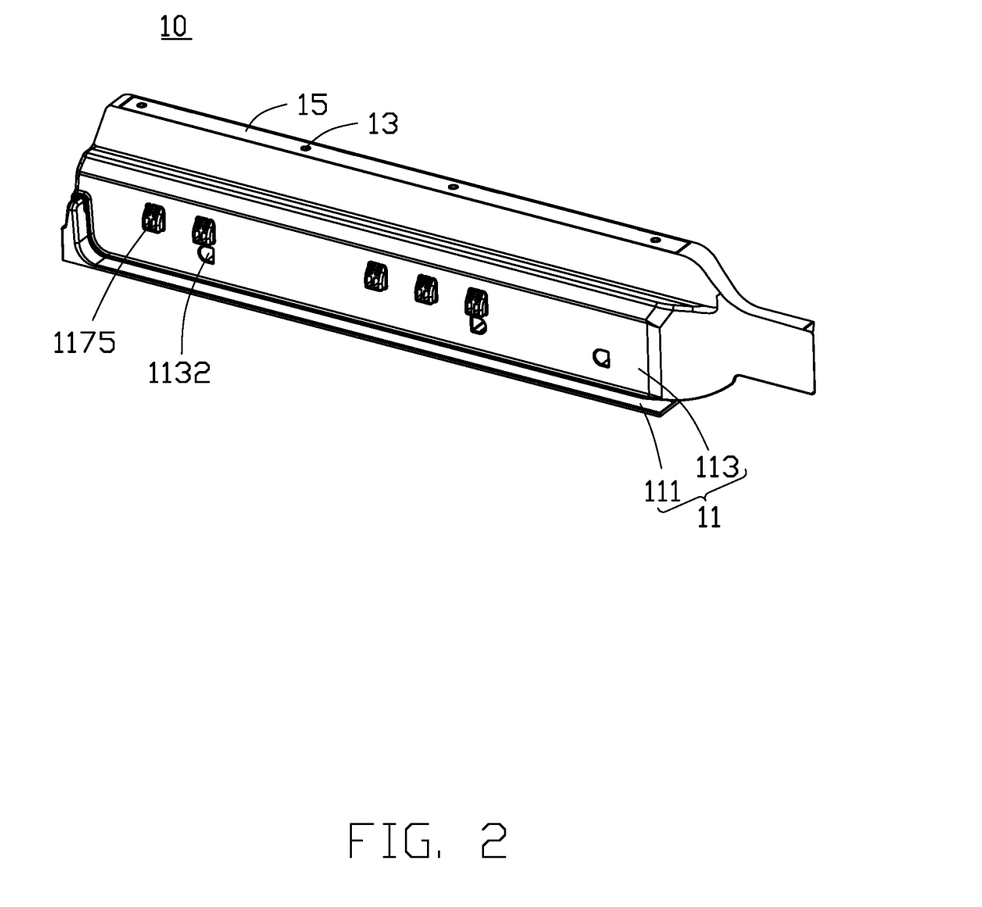
FIG. 2 is an isometric view of the camera antifogging assembly of FIG. 1.

FIG. 2 illustrates that the camera antifogging assembly 10 includes a base 11, a camera 13, and an antifogging plate 15.

Figure 3:
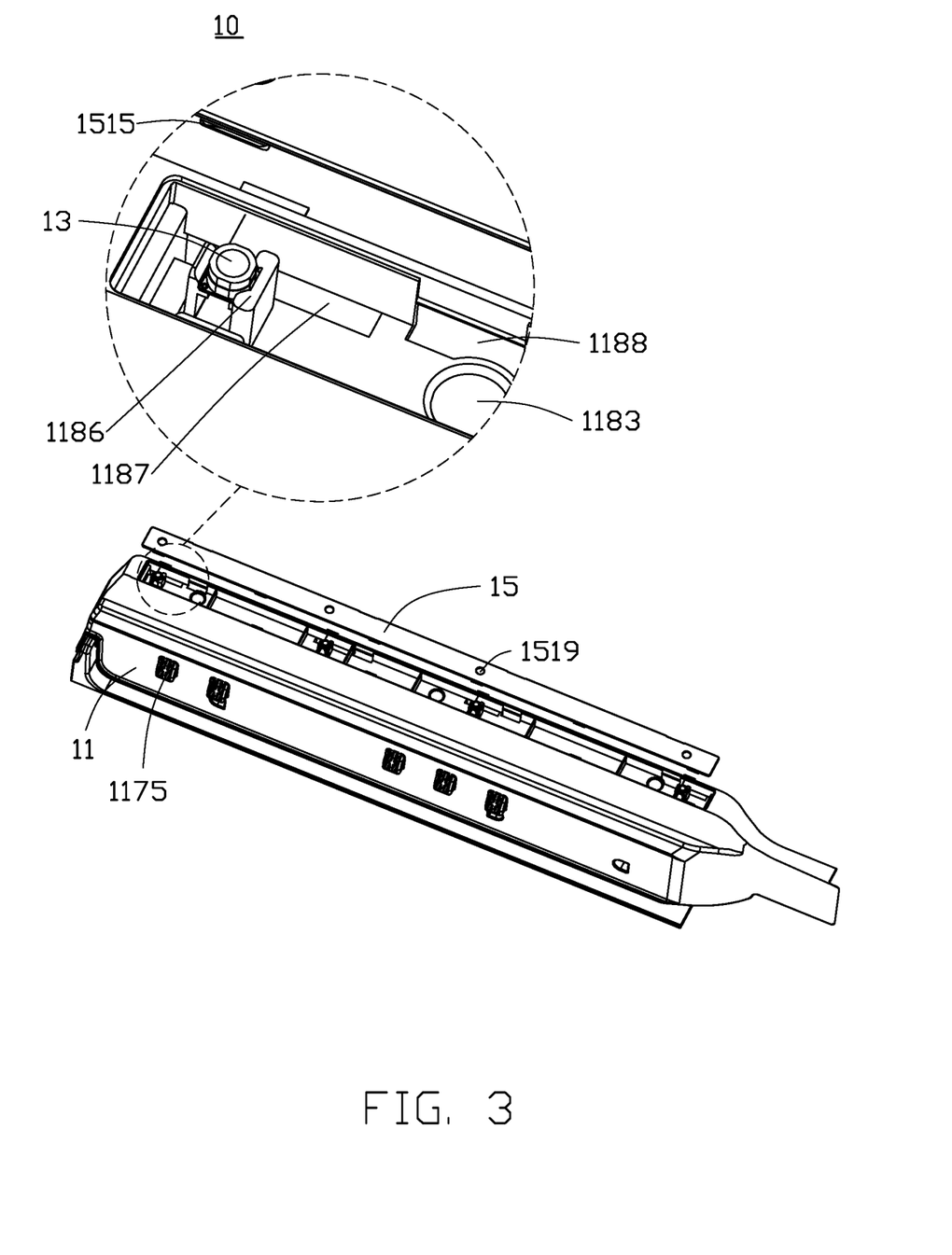
FIG. 3 is a partial view of the camera antifogging assembly of FIG. 2.
Figure 4:
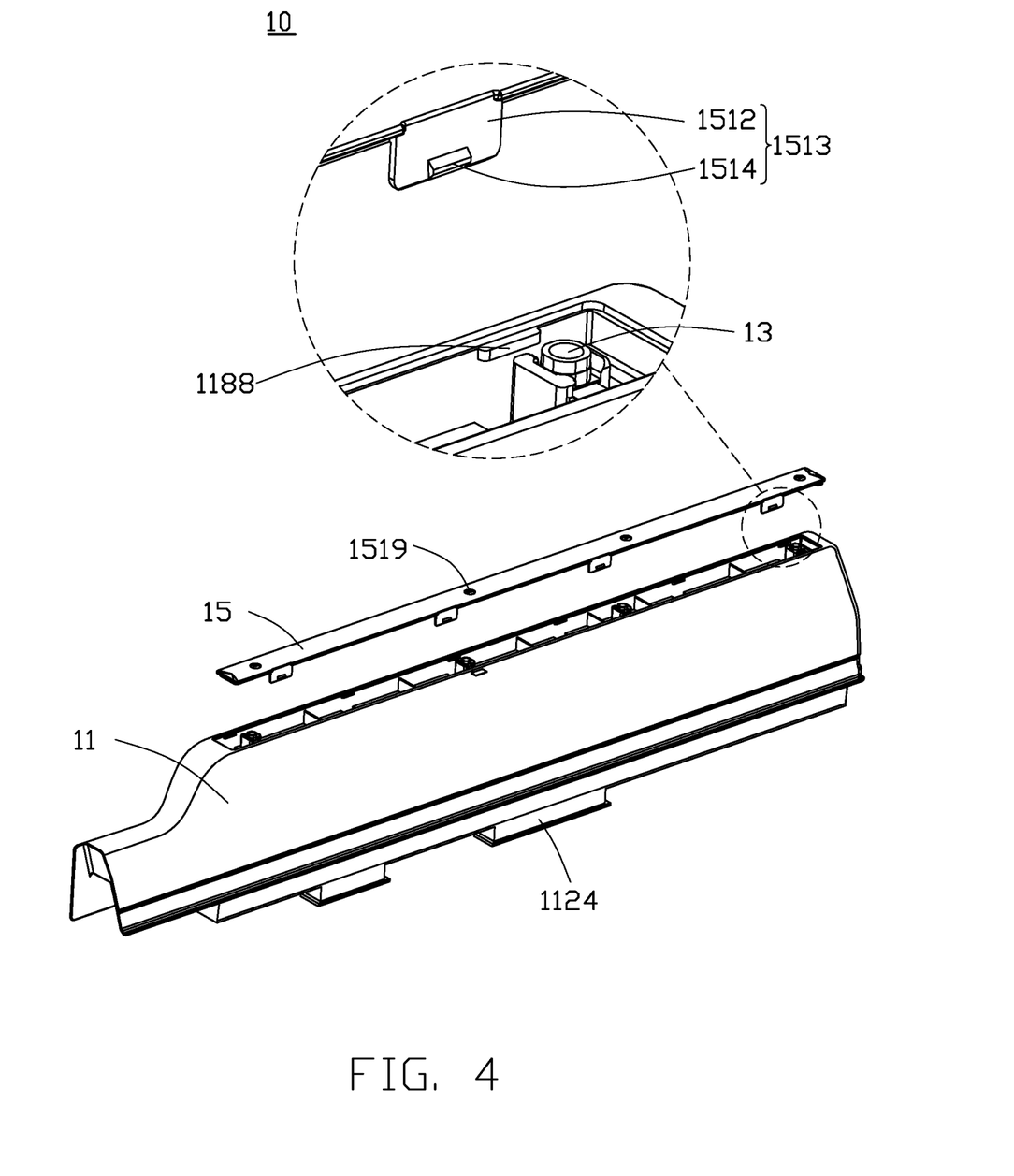
FIG. 4 is another partial view of the camera antifogging assembly of FIG. 3.

FIGS. 2, 3, and 4 illustrate that the base 11 is for receiving the camera 13. The base 11 includes a locking base 111 and a securing base 113.

Figure 5:
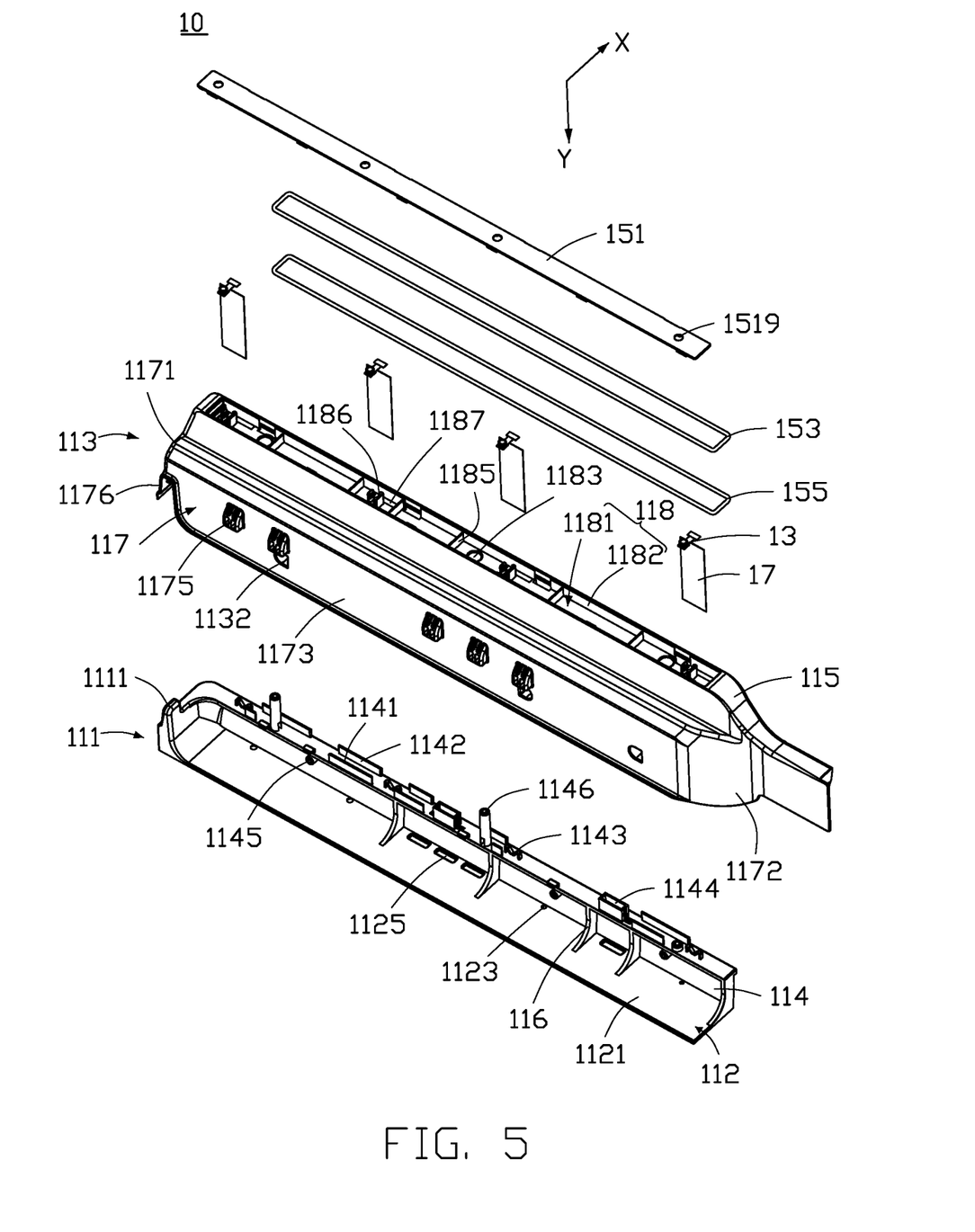
FIG. 5 is an exploded view of the camera antifogging assembly of FIG. 2.
Figure 6:
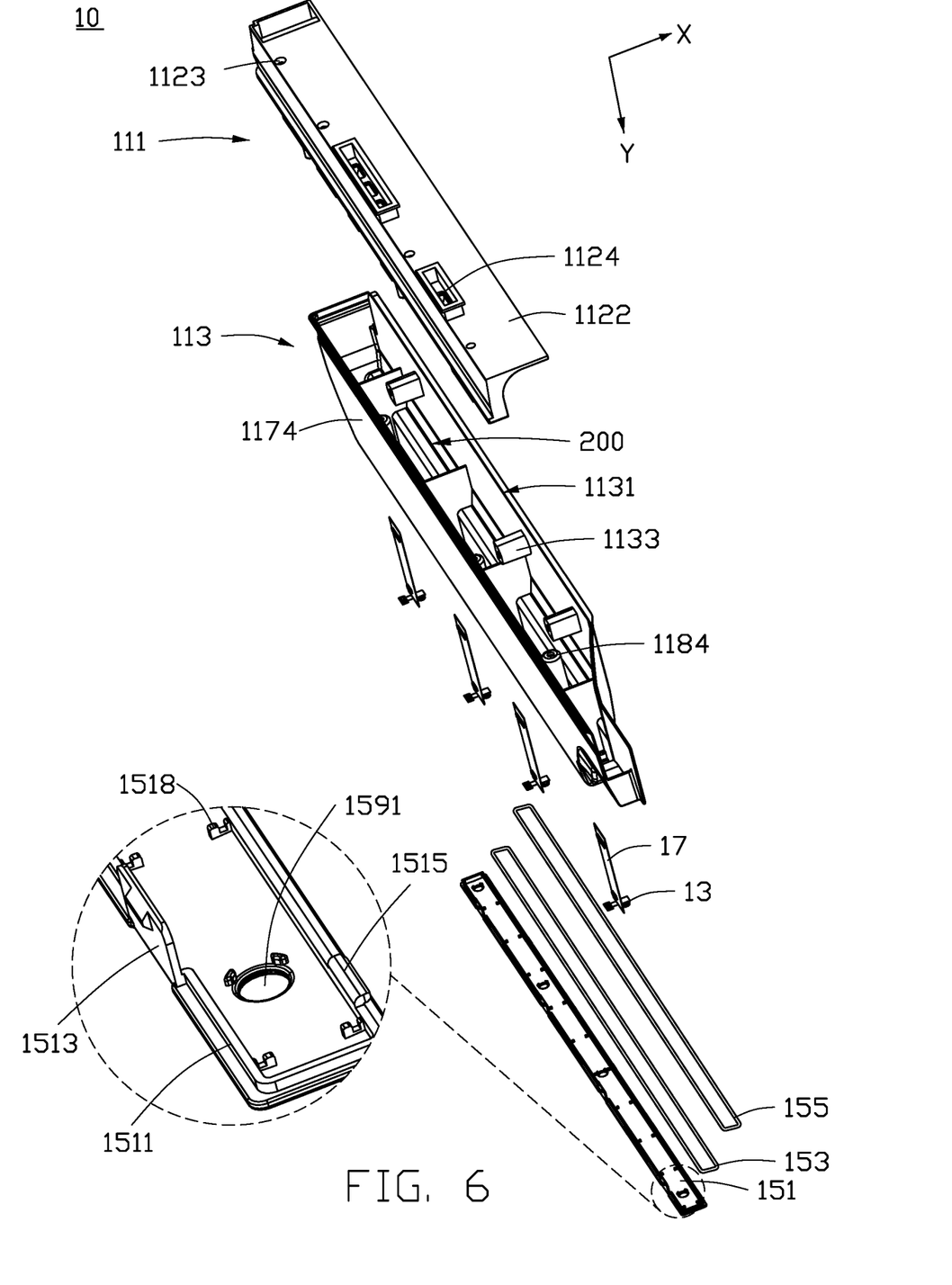
FIG. 6 is another exploded view of the camera antifogging assembly of FIG. 5.

Referring to FIGS. 5 and 6, an intersecting surface of the locking base 111 is substantially L-shaped. The locking base 111 includes a bottom board 112 and a protruding portion 114. The bottom board 112 is substantially a rectangular board. The bottom board 112 includes a first surface 1121 facing the door 30 and a second surface 1122 facing away from the door 30.

The protruding portion 114 protrudes from an edge of the first surface 1121. In addition, the locking base 111 further includes an enforcing rib 116. The enforcing rib 116 is substantially L-shaped. The enforcing rib 116 is between the bottom board 112 and the protruding portion 114, which is for reinforcing a connection between the bottom board 112 and the protruding portion 114.

The bottom board 112 defines a plurality of locking holes 1123. The locking holes 1123 are for the insertion of by screws for locking the locking base 111 to the inner surface 301.

The bottom board 112 includes a plurality of blocks 1124 on the second surface 1122. The inner surface 301 includes a plurality of grooves (not shown) corresponding to the blocks 1124. Thus, the locking base 111 is coupled to the inner surface 301 through coupling the blocks 1124 into the grooves.

In another embodiment, the locking base 111 can be built into the inner surface 301, the protruding portion 114 protrudes from the inner surface 301.

The protruding portion 114 includes cabling grooves 1141 for securing cables (not shown) of the camera antifogging assembly 10. The protruding portion 114 is substantially L-shaped and includes a sidewall substantially perpendicular to the bottom board 112 and a top wall substantially parallel to the bottom board 112. The top wall of the protruding portion 114 includes two protrusion walls 1142. The two protrusion walls 1142 and the top wall of the protruding portion 114 cooperatively form the cabling groove 1141.

The top wall of the protruding portion 114 further includes at least one positioning latch 1143. In at least one embodiment, the positioning latch 1143 is substantially M-shaped and for positioning and holding cables received in the cabling groove 1141, which avoids detachment of the cables.

The bottom board 112 further includes at least one first outlet hole 1125. The top wall of the protruding portion 114 further includes at least one second outlet hole 1144. The at least one first outlet hole 1125 and the at least one second outlet hole 1144 are both for entry and exit of cables.

The securing base 113 is substantially rectangular and includes a top wall 115 and an external wall 117. The external wall 117 includes an upper external wall 1171, a lower external wall 1172, a left external wall 1173, and a right external wall 1174. The upper external wall 1171, the lower external wall 1172, the left external wall 1173, and the right external wall 1174 surround the top wall 115 and cooperatively form a receiving portion 200. The receiving portion 200 includes an opening 1131. The protruding portion 114 is received in the receiving portion 200 through the opening 1131.

In other embodiments, the door 30 further includes a storing box 40 (shown in FIG. 1). The external wall 117 of the securing base 113 includes at least one projection 1175 for securing the storing box 40 on the door 30.

The external wall 117 defines at least one first hole 1132 through the external wall 117. The external wall 117 includes at least one first connecting post 1133 positioned in the receiving portion 200. The first connecting post 1133 corresponds to the first hole 1132. One end of the first connecting post 1133 is perpendicular to the external wall 117, the other end of the first connecting post 1133 extends inwardly in the receiving portion 200. In at least one embodiment, the first connecting post 1133 is coupled to the left external wall 1173. Correspondingly, the protruding portion 114 includes at least one first mounting post 1145 corresponding to the first connecting post 1133. The first mounting post 1145 can be a bolt. A screw can be coupled to the first connecting post 1133 through the first hole 1132 and coupled into the first mounting post 1145, thus, the securing base 113 is coupled to the locking base 111 in a first direction, such as an X-axis direction.

The top wall 115 of the securing base 113 defines a slot 118. The slot 118 is substantially rectangular. The slot 118 includes a bottom wall 1181 and a peripheral wall 1182. The slot 118 is for setting and supporting the camera 13. The slot 118 faces the body 20. Thus, the camera 13 set in the slot 118 can capture images of the goods in the body 20. In addition, the refrigerator 100 further includes tablet computer (not shown). The tablet computer is coupled to the outer surface 303 of the door 30. The tablet computer is electrically connected to the camera 13 by wires or wirelessly and for processing and storing images captured by the camera 13. Therefore, the user may view the contents of the refrigerator 100 when the door 30 is closed.

The slot 118 defines at least one second hole 1183 throughout the bottom wall 1181. The bottom wall 1181 includes at least one second connecting post 1184 in the receiving portion 200. The second connecting post 1184 is substantially a hollow column corresponding to the second hole 1183. One end of the second connecting post 1184 is substantially perpendicularly connected to the bottom wall 1181, another end of the second connecting post 1184 extends inwardly in the receiving portion 200. The protruding portion 114 includes at least one second mounting post 1146 corresponding to the second connecting post 1184. The second mounting post 1146 can be a bolt. A screw can be coupled to the second connecting post 1184 through the second hole 1183 and coupled into the second mounting post 1146, thus the securing base 113 is coupled to the locking base 111 in a second direction, such as a Y-axis direction. The first direction is perpendicular to the second direction.

In other embodiments, the upper external wall 1171 includes a latching portion 1176. The latching portion 1176 is substantially hook-shaped. The locking base 111 includes latching rib 1111 corresponding to the latching portion 1176. The securing base 113 is coupled to the locking base 111 in the second direction through latching the latching portion 1176 to the latching rib 1111.

In other embodiments, the slot 118 further includes a plurality of baffles 1185 for supporting the antifogging plate 15.

The bottom wall 1181 includes at least one first clip 1186 for clipping the camera 13 to the securing base 113. Particularly, the first clip 1186 is substantially U-shaped.

The camera antifogging assembly 10 further includes at least one connector 17 for electrically connecting the camera 13 to other electronic elements on the door 30. Particularly, the connector 17 is substantially sheet-shaped. Correspondingly, the bottom wall 1181 defines at least one via 1187 for receiving the connector 17. The via 1187 is adjacent to the first clip 1186. When an end of the connector 17 that is not connected to the camera 13 is inserted through the via 1187, the camera 13 can be clipped into the first clip 1186.

In at least one embodiment, the antifogging plate 15 includes a cover 151 and a heat generator 153.

The cover 151 covers the slot 118 and is for securing the camera 13. In at least one embodiment, a shape and a size of the cover 151 correspond to the slot 118. The cover 151 is substantially rectangular and includes four edges. Particularly, the cover 151 includes two long edges and two short edges.

The cover 151 further includes a latching frame 1511 (shown in FIG. 6). The latching frame 1511 is latched to the slot 118. Particularly, the latching frame 1511 is substantially ring-shaped. When the cover 151 covers the slot 118, the latching frame 1511 is received in the slot 118 and resists against the peripheral wall 1182 of the slot 118.

The cover 151 further includes a plurality of latching pieces 1513 and a plurality of latching blocks 1515 on peripheral edge. The latching pieces 1513 and the latching blocks 1515 are adjacent to the latching frame 1511. The latching piece 1513 includes a main part 1512 and a hook part 1514 (shown in FIG. 4). The main part 1512 is formed by an extension from the latching frame 1511. The hook part 1514 is formed on an end of the main part 1512 that is away from the latching frame 1511. The main part 1512 is a substantially sheet of material. The latching block 1515 is substantially rectangular. The latching pieces 1513 and the latching blocks 1515 are arranged alternately (shown in FIG. 6).

The slot 118 includes a plurality of latching slots 1188 on the peripheral wall 1182. The latching pieces 1513 and the latching blocks 1515 are latched to the latching slots 1188. When the latching frame 1511 is latched to the slot 118, the latching pieces 1513 and the latching blocks 1515 are latched to the latching slots 1188, thus the cover 151 can be coupled to the slot 118.

The cover 151 further includes a plurality of second clips 1518. The second clips 1518 are formed on a surface of the cover 151 facing the slot 118. The second clips 1518 are substantially C-shaped. The heat generator 153 is clipped to the second clips 1518. The second clips 1518 are arranged in a space surrounded by the latching portions 1511 and adjacent to the latching portions 1511. In at least one embodiment, the heat generator 153 is a thermal fuse. The heat generator 153 is substantially circular.

In other embodiments, the heat generator 153 is covered by a protective film 155. The protective film 155 avoids direct contact between the heat generator 153 and the cover 151 or the camera 13. The protective film 155 is a silver or silvered material.

The cover 151 defines at least one aperture 1519 corresponding to the camera 13. The aperture 1519 exposes the lens of the camera 13 from the cover 151. Thus, the cover 151 may secure the camera 13 and not block the camera 13. The heat generator 153 surrounds the camera 13 to maintain a non-fogging temperature of the lens of the camera 13, thus avoiding fog in the lenses of the camera 13 caused by temperature differences when opening and closing the door 30.

In general, the camera 13 is secured on the base 11 and is exposed from the cover 151 by the aperture 1519. The heat generator 153 surrounds the camera 13 to maintain a sufficiently high temperature around the camera 13, thus the image-capturing ability of the camera 13 is not impaired. In addition, the camera antifogging assembly 10 has a simple structure and can be easily assembled.

It is believed that the exemplary embodiments and their advantages will be understood from the foregoing description, and it will be apparent that various changes may be made thereto without departing from the scope of the disclosure or sacrificing all of its advantages. The examples herein described are mere illustrative exemplary embodiments of the disclosure.

What is claimed is:

1. A camera antifogging assembly for being coupled to a door of a refrigerator, the camera antifogging assembly comprising:
   a base for being coupled to the door;
   a camera coupled to the base; and
   an antifogging plate comprising:
      a cover covering to the base; and
      a heat generator coupled to the cover and surrounding the camera;
   wherein the base includes a locking base and a securing base, the locking base is coupled to the door, the securing base is secured on the locking base, the locking base includes a bottom board and a protruding portion, the bottom board is coupled to the door, the securing base includes a top wall and an external wall, the external wall surrounds the top wall and cooperatively form a receiving portion, the receiving portion includes an opening, the protruding portion is received in the receiving portion through the opening, the bottom board of the locking base covers the opening, the top wall defines a slot for receiving the camera, the slot includes a bottom wall and a peripheral wall, the cover covers the slot.

2. The camera antifogging assembly as claimed in claim 1, wherein the protruding portion is perpendicular to the bottom board.

3. The camera antifogging assembly as claimed in claim 1, wherein the securing base further includes at least one first clip for clipping the camera, the clip is formed on the bottom wall of the slot, the clip is U-shaped.

4. The camera antifogging assembly as claimed in claim 1, wherein the cover includes a latching frame, the latching frame is ring-shaped, the latching frame is formed on a surface of the cover facing the base, the latching frame is received in the slot and resisted to the peripheral wall of the slot.

5. The camera antifogging assembly as claimed in claim 1, wherein the cover further includes a plurality of latching pieces, the latching pieces are adjacent to the latching frame, the latching piece includes a main part and a hook part, the hook part is formed on an end of the main part that away from the latching frame, the slot includes a plurality of latching slots on the peripheral wall, the latching pieces are correspondingly latched to the latching slots, thus the cover is latched to the slot.

6. The camera antifogging assembly as claimed in claim 1, wherein the cover further includes a plurality of second clips, the second clips are formed on a surface of the cover facing the slot, the second clips are C-shaped, the heat generator is clipped to the second clips.

7. The camera antifogging assembly as claimed in claim 1, wherein the heat generator is coated by a protective film.

8. A refrigerator comprising:
   a body;
   a door coupled to the body; and
   a camera antifogging assembly for being coupled to the door, the camera antifogging assembly comprising:
      a base for being coupled to the door;
      a camera coupled to the base; and
      an antifogging plate comprising:
         a cover covering to the base; and
         a heat generator coupled to the cover and surrounding the camera
      wherein the base includes a locking base and a securing base, the locking base is coupled to the door, the securing base is secured on the locking base, the locking base includes a bottom board and a protruding portion, the bottom board is coupled to the door, the securing base includes a top wall and an external wall, the external wall surrounds the top wall and cooperatively form a receiving portion, the receiving portion includes an opening, the protruding portion is received in the receiving portion through the opening, the bottom board of the locking base covers the opening, the top wall defines a slot for receiving the camera, the slot includes a bottom wall and a peripheral wall, the cover covers the slot.

9. The refrigerator as claimed in claim 8, wherein the protruding portion is perpendicular to the bottom board.

10. The refrigerator as claimed in claim 8, wherein the securing base further includes at least one first clip for clipping the camera, the clip is formed on the bottom wall of the slot, the clip is U-shaped.

11. The refrigerator as claimed in claim 8, wherein the cover includes a latching frame, the latching frame is ring-shaped, the latching frame is formed on a surface of the cover facing the base, the latching frame is received in the slot and resisted to the peripheral wall of the slot.

12. The refrigerator as claimed in claim 8, wherein the cover further includes a plurality of latching pieces, the latching pieces are adjacent to the latching frame, the latching piece includes a main part and a hook part, the hook part is formed on an end of the main part that away from the latching frame, the slot includes a plurality of latching slots on the peripheral wall, the latching pieces are correspondingly latched to the latching slots, thus the cover is latched to the slot.

13. The refrigerator as claimed in claim 8, wherein the cover further includes a plurality of second clips, the second clips are formed on a surface of the cover facing the slot, the second clips are C-shaped, the heat generator is clipped to the second clips.

14. The refrigerator as claimed in claim 8, wherein the heat generator is coated by a protective film.

* * * * *